Dec. 1, 1942.　　　　W. H. GRINDLE　　　　2,303,995
CHEMICAL HEATER FOR USE IN A SYSTEM FOR
GENERATING GAS FROM LIQUEFIED GAS
Filed Sept. 8, 1941　　　3 Sheets-Sheet 1
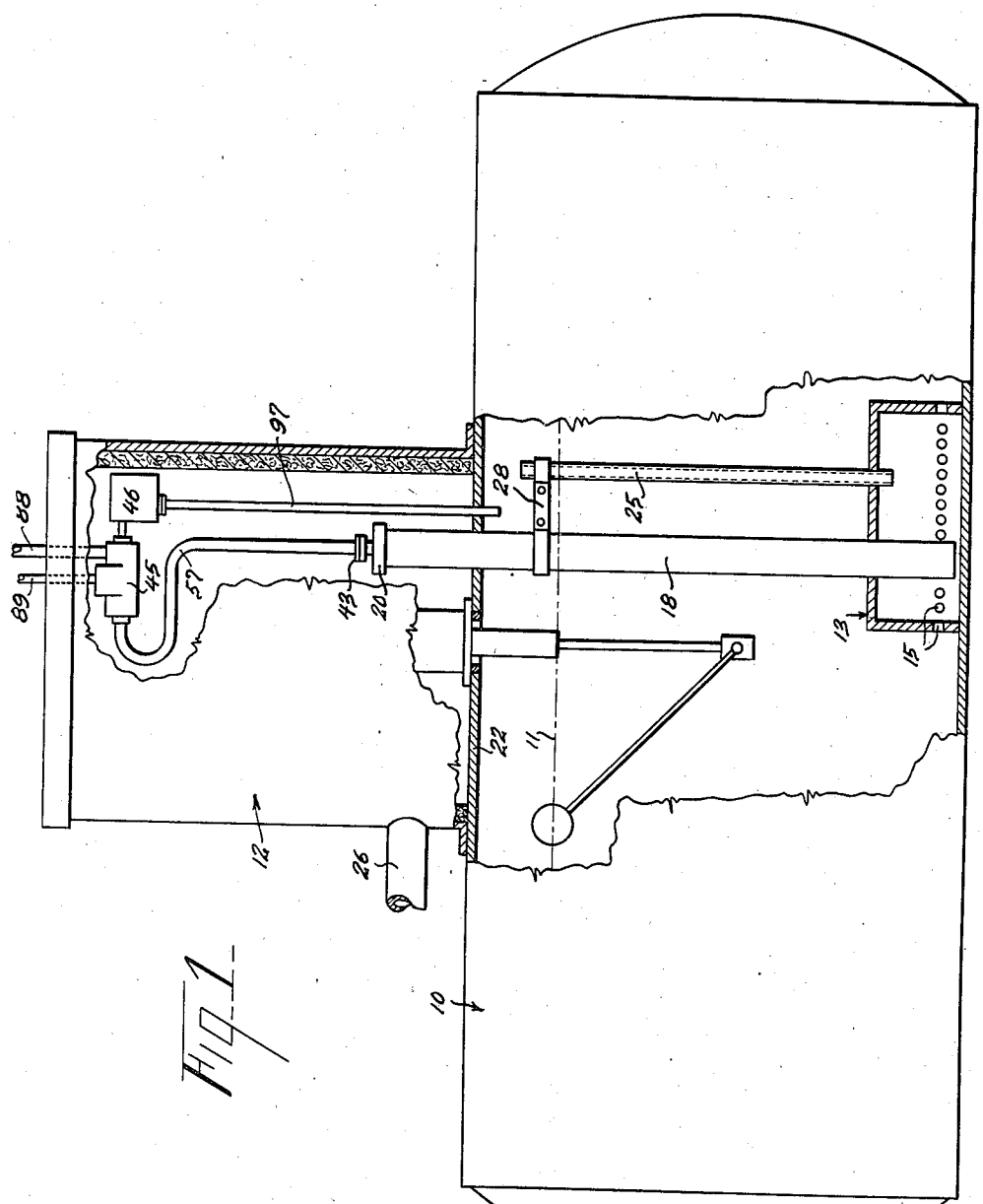
Inventor
William H. Grindle
By Carl Miller
Attorney

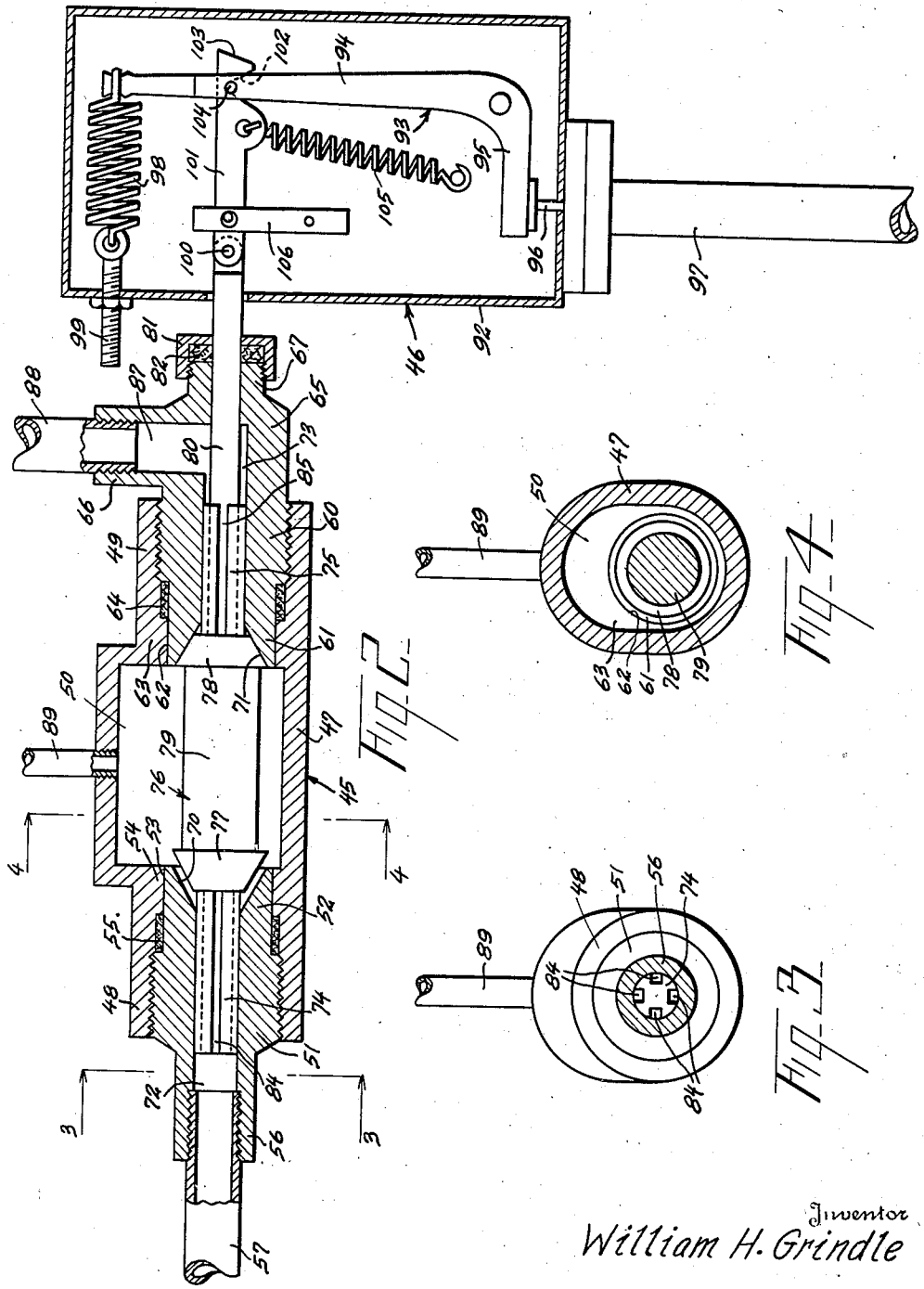

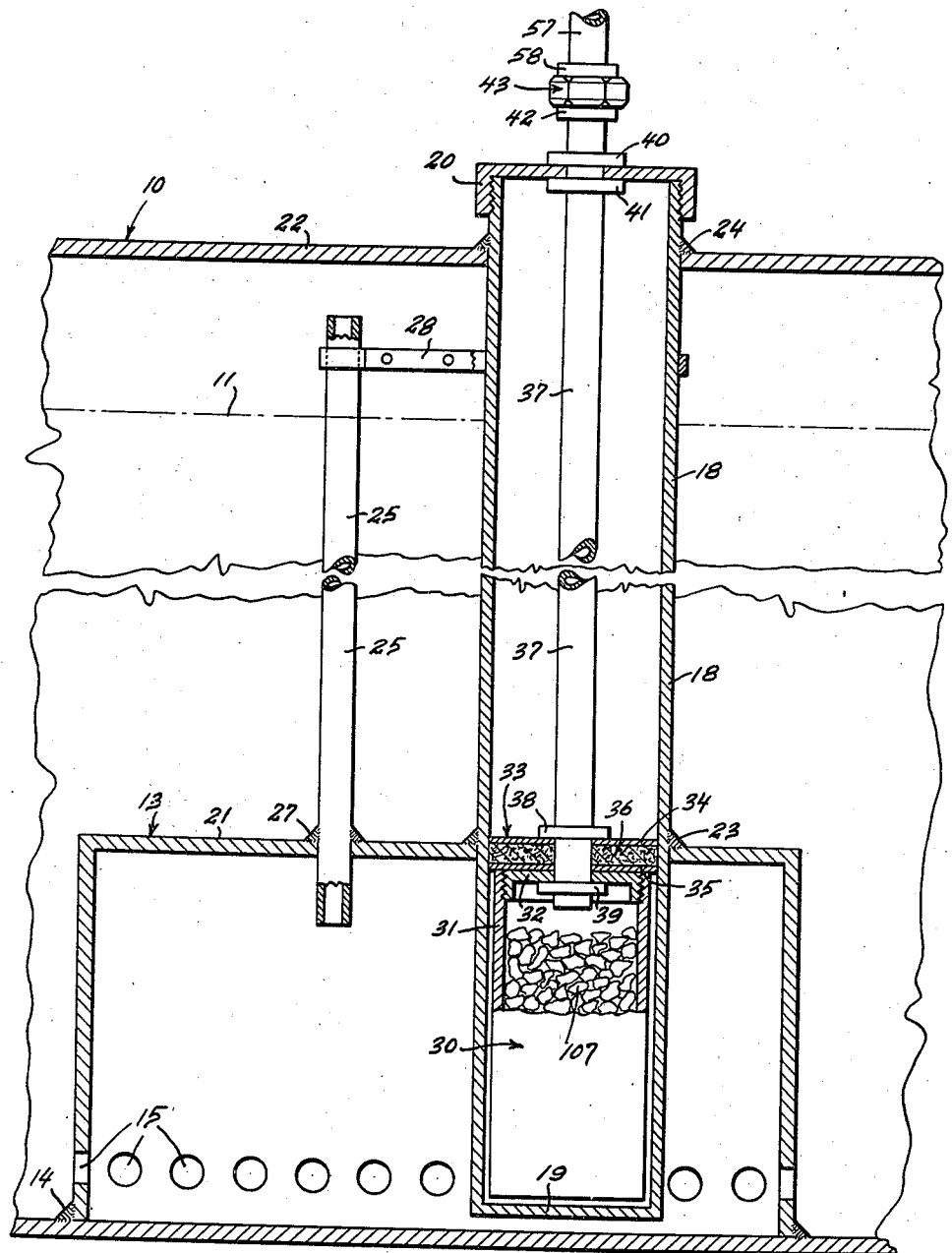

Patented Dec. 1, 1942

2,303,995

UNITED STATES PATENT OFFICE 2,303,995

CHEMICAL HEATER FOR USE IN A SYSTEM FOR GENERATING GAS FROM LIQUEFIED GAS

William H. Grindle, Harlingen, Tex.

Application September 8, 1941, Serial No. 410,020

10 Claims. (Cl. 62—1)

One of several defects in the ordinary liquefied petroleum gas plants is the annoying habit of the pressure dropping to an extremely low point whenever a large vapor withdrawal load is placed on it. This usually happens in the wintertime merely because of the fact that more heating stoves and other appliances are being used. However, gas plant failures are not uncommon even in summertime if the load is heavy, especially in commercial plants which are furnishing gas vapor to gas engines, cotton and grain dryers, sterilizers, etc. This gas pressure failure is accounted for by the fact that whenever any liquid is evaporated or vaporized, the process causes a cooling or refrigerating effect at the point of vaporization. In the case of a tank of liquefied petroleum gas in a gas plant, the vaporization point is over the entire surface of the liquid. As this process goes on, the liquid gradually becomes colder and colder until its temperature is reduced below its vaporization point. Even the tank itself and the surrounding earth (in the case of an underground plant) becomes so cold that it cannot supply any more heat to vaporize the liquid within the plant. When this occurs a gas failure is evident and artificial heat must be applied if service is to continue.

Another defect in the ordinary gas plants is the fact that where a mixture of several liquefied gases are used, at periods when no vapors are being withdrawn the various gases stratify or seek different levels owing to their different specific gravities.

When this occurs, the B. t. u. content of the vapors differ on being withdrawn and cause another annoying condition to occur. As an example; suppose a cook stove was adjusted to a mixture of 30% propane (2519 B. t. u.) and 70% butane (3274 B. t. u.) or a combination value of 2765 B. t. u. The stove would burn sufficiently because it would be consuming exactly the right amount of air to produce the perfect flame. Now suppose the stove is not in use for some time and the two liquids stratify. When the stove is again lighted, it will blow and cause an unpleasant odor because it will be using the same amount of air but will be supplied with a vapor with a B. t. u. value of somewhere near 2519 B. t. u. Therefore the flame will not be perfect nor efficient, because the burner will be sucking in more air than is needed for this value vapor. This has occurred because the propane being lighter has risen to the top of the liquid level. This condition will continue to exist until the butane is reached and then the burner will begin to smoke because altho it is still using the same amount of air, it is now being supplied with a vapor somewhere near a 3274 B. t. u. value. In this case not enough air is being supplied so all the vapor is not being consumed and the unburned portion is deposited on the bottom of the pan or kettle in the form of soot.

Therefore what is needed is a plant which will in addition to keeping up the gas pressure also prevent the various gases from stratifying.

This invention relates to liquefied gas dispensing systems of the general type disclosed in my co-pending application Serial No. 300,471, filed October 20, 1939, which has matured into Letters Patent No. 2,256,591 September 23, 1941, and among other objects contemplates the provision of an automatically controlled heat exchange device for maintaining the pressure of the gas generated in a storage tank of the aforesaid mentioned system substantially constant in cold climates and under varying weather conditions. More particularly, it is the principal object of this invention to provide a chemical heater in heat exchanging relation with the liquefied gas of the system, the chemical heater being activated by water supplied thereto by means of a valve automatically operated by a pressure trip device controlled in response to the pressure of the generated gas.

Another object of this invention is to provide in the gas generating system of the type referred to above, a chemical heating device adapted to met the rigid requirements of fire underwriters and avoid the danger of an explosion and which chemical heating device furthermore is of simple design, efficient in operation, economical and cheap to manufacture.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawings wherein:

Figure 1 is an elevational view with parts cutaway to show details of construction of a preferred form of gas generating system with the chemical heating device.

Figure 2 is a cross-sectional view of the automatic water control valve and pressure controlled trip mechanism therefor.

Figure 3 is a detail sectional view on line 3—3, Figure 2.

Figure 4 is a detail sectional view on line 4—4, Figure 2.

Figure 5 is a detail sectional view of the chemical heater construction and mounting thereof in liquefied gas tank.

Referring to the drawings in detail 10 denotes a conventional form of tank which is adapted to contain a supply of liquefied petroleum gas 11, the tank 10 being provided with a dome 12 housing the valves, regulators, governor and other devices for the control and delivery of the generated gas which elements form no part of the present invention and hence are not shown. The tank 10 may be located either above or below the ground and may be of any desired capacity.

Located on the bottom of the tank 10 directly beneath the dome 12 is a trap or dome 13 of inverted box-like form having the wall edges thereof at its open end abutting the tank bottom and preferably secured thereto by welding as at 14. The walls of the trap 13 adjacent the welded edges thereof are provided with a plurality of openings 15 to permit the liquefied petroleum gas to enter the trap. Extending vertically from the trap 13 is a heating well 18 having its lower end projecting into the trap 13 and terminating but slightly from the bottom of the tank. The heating well 18 is preferably formed of pipe stock of a relatively large diameter with its lower end, provided with fixed and rigid end wall 19, which end wall, see Figure 5, is as indicated above slightly spaced from the bottom of the tank. The upper end of the heating well 18 is open and extends outwardly of the tank 10 and into the dome 12 for a desired distance. Preferably the upper end of the heating well should be so located in the dome 12 as to be readily accessible, so as to permit the easy placement therein and removal therefrom of the chemical heater to be hereinafter described. Mounted on the open end of the heating well 18 is a closure cap 20 which is secured thereto by a threaded engagement therewith. At the points where the heating well 18 extends through the top wall 21 of the trap 13 and the top wall 22 of the tank 10, the heating well is permanently secured thereto, respectively, as by the welds 23 and 24, thus insuring a rigid and leakproof connection of the heating well.

Arranged to one side of the heating well 18 and parallel thereto is a spewing pipe 25, the lower end of which extends through the top wall 21 of the trap 13 for a slight distance below the same and the upper end of which terminates a slight distance below the top wall 22 of the tank 10, so as to be above the level of the liquefied petroleum gas in the tank, see Figure 1. The space in the tank 10 above the level of the liquefied petroleum gas serves as a reservoir for the generated gas which is supplied to the point of use through the delivery pipe 26, in the manner well known. The spewing pipe 25 is open at both ends, see Figure 5, and is welded to the top wall 21 of the trap 13 as at 27 to effect a rigid and leak proof connection. A brace 28 supports the upper end of the spewing pipe 25 by connecting the same to the heating well 18.

Located at the bottom of the heating well 18 is the chemical heater 30 which comprises a cylindrical container 31 formed of a non-corrosive material such as Pyrex glass, porcelain, hard rubber, etc., open at its top and provided with a removable plug cap 32 secured thereto as by a threaded engagement with the inside wall of said container. Superposed above, the plug cap 32 is an insulating cap 33 comprising upper and lower metal discs 34, 35 and an intermediate disc of insulating material 36 such as asbestos, the complete insulating cap 33 having a diameter such as to slidably engage the inside cylindrical wall of the heating well 18. The insulating cap 33 and juxtaposed plug cap 32 are fixedly mounted on the lower end portion of a water pipe 37, being retained in fixed relation thereto by the clamping collars 38—39, the connection being such as to be positively leak-proof both against water and the gases generated in the chemical container 31. The water pipe 37 at its upper end extends axially through the heating well closure cap 20 and is similarly secured thereto by clamping collars 40—41, the terminal end of the water pipe 37 having fixed thereto a section 42 of a pipe union fitting 43.

The chemical container 31 is of cylindrical form and of an external diameter such as to provide for but slight clearance between the same and the inside wall surface of the heating well 18, as clearly shown in Figure 5. Furthermore the container 31 is suspended from the end of the water pipe 37 by virtue of its connection to its plug cap 32, and is of such a length that the bottom of the container is but slightly spaced from the bottom wall 19 of the heating well. Preferably the arrangement of the container mounting is such that the insulating cap 33 thereof lies in the plane of the top wall 21 of the trap 13 whereby the chemical container 31 will lie wholly within the trap 13, albeit confined within the heating well 18, see Figure 5. The heat thus generated by the chemical heater 30, in the manner as will be hereinafter described, is directed entirely within the trap 13 and is prevented from escaping upwardly of the heating well by the insulating cap 33.

Suitably located within the dome 12 is a double acting valve mechanism 45 and a pressure controlled trip 46 for operating the same. The valve and trip mechanism is shown in detail in Figure 2. The double acting valve comprises a housing 47 formed to provide cylindrical ends 48 and 49, and a central enlarged chamber 50. The valve housing end 48 threadedly receives a plug 51 having an inner cylindrical portion 52 snugly fitted in the bore 53 of a shoulder 54, the plug 51 compressing between the threaded portion thereof and shoulder 54, a packing 55. Extending outwardly from the threaded portion of the plug is a sleeve 56 which threadedly receives one end of a water pipe 57, the other end of which carries the mating section 58 of the pipe union fitting 43. If desired the water pipe 57 may be formed of flexible tubing to facilitate handling thereof when the union 43 is disconnected for effecting removal of the chemical container 30. In a like manner the other valve housing end 49 threadedly receives a plug 60 having an inner cylindrical portion 61 snugly fitted in the bore 62 of a shoulder 63, the plug 60 compressing between the threaded portion thereof and shoulder 63, a packing 64. The plug 60 is provided outwardly of the threaded portion with a sleeve 65 having a lateral extension 66 and an axial boss 67.

The opposed faces of the cylindrical extensions 52 and 61 of the plugs 51 and 60 are provided with co-axial frusto-conical valve seats 70 and 71 respectively, and extending co-axially within the plugs are bores 72 and 73, respectively. Slidably extending into the bores 72 and 73 are the guide stems 74 and 75, respectively of a double valve 76 comprising axially spaced frustoconical valves 77 and 78 adapted for seating engagement with the valve seats 70 and 71, respectively, connected by a shank portion 79. Extending axially from the guide stem 75 is a guide rod 80 which extends outwardly of the boss 67. A cap 81 surrounds the guide rod 80 contains a packing 82, the cap 81 being threadedly mounted on the boss 67. Preferably the double valve 76 is machined as a single unit and the guide stems 74 and 75 are each provided with a plurality of longitudinal grooves 84 and 85, respectively, that extend from the valves 77, 78 to the terminal outer ends of said guide stems. The valves 77 and 78 are spaced apart a distance such that when one valve is seated on its seat the other valve will be spaced from its seat, as clearly shown in Figure 2.

The lateral extension 66 of plug 60 is provided with a passage 87 communicating with the bore 73, and threadedly receives one end of a water supply pipe 88. Connected to the water chamber 50 is a vent pipe 89. Thus with the valve 77 seated on its seat 70, water supplied from the pipe 88 enters the chamber 50 through the passage 87, bore 73 and grooves 85 in guide stem 75. When valve 77 is unseated, as will be hereinafter described, the other valve 78 seats on its seat 71 thus closing off the supply of water into the chamber 50, the water trapped in said chamber then escaping through grooves 84 and bore 72 into water delivery pipe 57 to be conducted to chemical heater 30.

The double valve 79 is under the direct control of the pressure controlled trip indicated generally by the reference character 46. Mounted within a casing 92 is a bell-crank lever 93 having a long arm 94 and a short arm 95. The short arm 95 engages a plunger 96 the lower end of which is connected to a piston or diaphragm (not shown) adapted to be acted on by the pressure of the generated gas in the pressure pipe 97 which extends from the casing 92 through the top wall 22 of the tank 10 into the gas chamber (above the level of the liquefied gas) therein. Thus, the movement or the position of the plunger 96 is dependent on the pressure of the generated gas. A tension coil spring 98 rendered adjustable by the screw 99 is connected to the upper end of the long arm 94.

The guide rod 80 extends into the casing 92 and has pivotally connected thereto as at 100 one end of a latch 101, the other end of the latch being provided with inclined cam faces 102 and 103 arranged to be engaged by a pin 104 on the long arm 94. A coil spring 105 acts to hold the cam faces of the latch in engagement with the pin, movement of the latch being limited by a guide link 106. At high pressure the pin 104 engages the cam face 103 of the latch, which is moved to the left closing valve 77 and opening valve 78. At low pressure, the plunger 96 drops, bell-crank lever 93 being moved to the left by spring 98 so that pin 104 then engages cam face 102, this movement pulling latch 101 to the right to open valve 77 and close valve 78. The position of the parts shown in Figure 2 is that for low pressure. Movement of the bell-crank lever 93 provides for a trip action on the latch 101, the pin 104 riding on the cam faces 102 and 103 tripping the latch to move the same to a left or right position.

The chemical container 31 is filled (not completely) with any chemical compound or mixture 107 that will generate heat when water is added thereto. One such mixture is made up of 84% iron filings, 10% manganese dioxide and 6% sodium chloride. This mixture when dampened with a small amount of water generates approximately 90° centigrade of heat. The chemical container 31 should be of such a size as to hold a quantity of such a chemical mixture sufficient to generate heat through many cycles of low to high pressure of the generated gas.

In cold climates an anti-freeze such as alcohol may be added to the water supplied to the valve reservoir 50. This will not interfere with the chemical reaction and will prevent the water from freezing.

The operation of the chemical heater, double acting valve and pressure controlled trip is apparent from the above description and briefly is as follows:

When the pressure of the generated gas is low, the pressure is correspondingly reduced in the pressure pipe 97 to the piston or diaphragm (not shown) of the plunger 96 which drops allowing the spring 98 to pull the bell-crank lever 93 to left pin 104 being in engagement with cam face 103. This movement of bell-crank lever 93 to left will move latch 101 to the right as it is snapped into position when the pin 104 engages cam face 102. At this position double valve is moved to right closing water supply valve 78 and opening water delivery valve 77 permitting water in valve reservoir 50 to trickle through grooves 84 and bore 72, water pipes 57 and 37 to chemical container 31 wherein resulting chemical reaction will generate heat causing the liquefied gas to vaporize and build up a pressure within the tank. Increase in gas pressure is transmitted through pressure pipe 97 to piston or diaphragm (not shown) of plunger 96 which upon a predetermined increase will elevate plunger 96 and turn bell-crank lever 93 to right against tension of coil spring 98 causing latch 101 to snap to left as pin 104 engages cam face 103. This movement will move double valve to left closing water delivery valve 77 and opening water supply valve 78, thus letting water from water supply pipe 88 trickle into valve reservoir 50 through passage 87, bore 73 and grooves 85, whereby the device is ready for the next cycle which will begin whenever the gas pressure in the tank is reduced to a predetermined point causing tripping device to again snap into position allowing water from valve reservoir to trickle into chemical container.

In tank 10 the liquefied gas flows into the trap 13 through the bottom openings 15 and fills the same. Whenever any gas (vapor) is drawn from above the liquid level 11, the liquefied gas within the trap vaporizes and being trapped, the vapor pressure within the trap forces the liquefied gas from within the trap up through the spewing pipe 25 where it further vaporizes and mixes with the surrounding vapor and the rest of the liquefied gas falls back to mix with the main body of the liquefied gas thus preventing stratifying of the generated gas (vapor). This process goes on as long as any gas is withdrawn from the tank 10 regardless of whether the chemical device is generating heat. However when heat is produced, the spewing action becomes much more vigorous due to the fact that the liquefied gas within the trap is vaporizing faster.

Having thus described and illustrated the invention, what is claimed as new is:

1. In a system for generating gas from liquefied gas, a tank, a trap in the tank at the bottom thereof provided with perforations adjacent said tank bottom, a heating well traversing said tank and projecting into said trap, a chemical heating device mounted in said well and located in the portion thereof projecting into said trap, and a liquefied gas spewing pipe rising from said trap and terminating near the top of said tank.

2. In a system for generating gas from liquefied gas, a tank, a trap in the tank at the bottom thereof provided with perforations adjacent said tank bottom, a heating well traversing said tank and projecting into said trap, a pressure controlled chemical heating device rendered functionally operative by a supply of water thereto mounted in said well and located in the portion thereof projecting into said trap, and a liquefied gas spewing pipe rising from said trap and terminating near the top of said tank.

3. In a system for generating gas from liquefied gas, a tank, a trap in the tank at the bottom thereof provided with perforations adjacent said tank bottom, a heating well traversing said tank and projecting into said trap, a chemical heating device mounted in said well and located in the portion thereof projecting into said trap, a water reservoir connected to said chemical heating device, valve means for controlling the entry and discharge of water from said reservoir and a trip mechanism for operating said valve means responsive to pressure variations of the generated gas whereby to control the delivery of water to said reservoir and to said chemical heating device, and a liquefied gas spewing pipe rising from said trap and terminating near the top of said tank.

4. In a system for generating gas from liquefied gas, a tank, a trap in the tank at the bottom thereof provided with the perforations adjacent said tank bottom, a heating well traversing said tank and projecting into said trap, a chemical heating device mounted in said well and located in the portion thereof projecting into said trap, a valve housing including a reservoir, conduit means admitting water to said reservoir, conduit means delivering water from said reservoir to said chemical heating device, separate valve means for controlling the admission and discharge of water into and out of said reservoir, and a trip mechanism for operating said valve means responsive to pressure variations of the generated gas such that when the discharge valve is open to deliver water from the reservoir to the chemical heating device the admission valve for admitting water to the reservoir is closed and vice versa.

5. In a system for generating gas from liquefied gas, a tank containing said liquefied gas to a predetermined level providing a chamber thereabove for the accumulation of the generated gas, a trap in the tank at the bottom thereof provided with perforations adjacent said tank bottom, a heating well traversing said tank having its upper end projecting outwardly of said tank and its lower end portion projecting into said trap, a liquefied gas spewing pipe rising from said trap and terminating near the top of said tank and in said tank chamber, a chemical heating device comprising a container positioned at the bottom of said heating well and within said trap, a water delivery pipe extending axially into said heating well and suspending said container therein, a double valve housing including a water reservoir to which said water delivery pipe is connected, a water supply pipe connected to said reservoir, a reciprocating double valve in said valve housing arranged to alternately close off said water delivery and water supply pipes, and a pressure controlled trip mechanism for operating said reciprocating double valve responsive to predetermined low and high pressures of the generated gas in said tank chamber.

6. In a system for generating gas from liquefied gas, a tank containing said liquefied gas to a predetermined level providing a chamber thereabove for the accumulation of the generated gas, a trap in the tank at the bottom thereof provided with perforations adjacent said tank bottom, a heating well traversing said tank having its upper end projecting outwardly of said tank and its lower end portion projecting into said trap, a liquefied gas spewing pipe rising from said trap and terminating near the top of said tank and in said tank chamber, a chemical heating device comprising a container positioned at the bottom of said heating well and within said trap, a water delivery pipe extending axially into said heating well and suspending said container therein, a double valve housing including a water reservoir to which said water delivery pipe is connected, a water supply pipe connected to said reservoir, a reciprocating double valve in said valve housing arranged to alternately close off said water delivery and water supply pipes, and a pressure controlled trip mechanism for operating said reciprocating double valve responsive to predetermined low and high pressures of the generated gas in said tank chamber, said double valve housing and trip mechanism being located exteriorly of said tank, said pressure controlled trip mechanism comprising a pressure pipe extending into said tank chamber, and a plunger connected to said trip mechanism operated by the pressure in said pressure pipe.

7. A chemical heating device for use in a system for generating gas from liquefied gas including a tank containing said liquefied gas comprising a heating well traversing said tank, a chemical container positioned at the bottom of said heating well and adjacent the bottom of said tank, a water reservoir mounted exteriorly of said tank, a double valve means controlling the admission of water into and the discharge of water from said reservoir, conduit means communicating said reservoir to said chemical container, conduit means supplying water to said reservoir, and a pressure controlled trip mechanism for operating said double valve means responsive to predetermined low and high pressures of the generated gas in said system.

8. A chemical heating device for use in a system for generating gas from liquefied gas including a tank containing said liquefied gas comprising a heating well traversing said tank, a chemical container positioned at the bottom of said heating well and adjacent the bottom of said tank, a water reservoir mounted exteriorly of said tank, a double valve means controlling the admission of water into and the discharge of water from said reservoir, conduit means communicating said reservoir to said chemical container, conduit means supplying water to said reservoir, and a pressure controlled trip mechanism for operating said double valve means responsive to predetermined low and high pressures of the generated gas in said system, said heating well being closed at its bottom and having its upper end open and extending outwardly of said tank, a closure cap for the open end of said heating well, a portion of said conduit means delivering water to said chemical container being fixed to said closure cap and extending axially into said well, said chemical container comprising a removable closure plug secured to the lower end of said conduit means such that said chemical container is suspended within said heating well.

9. A chemical heating device for use in a system for generating gas from liquefied gas including a tank containing said liquefied gas comprising a heating well traversing said tank, a chemical container positioned at the bottom of said heating well and adjacent the bottom of said tank, a water reservoir mounted exteriorly of said tank, a double valve means controlling the admission of water into and the discharge of water from said reservoir, conduit means communicating said reservoir to said chemical container, conduit means supplying water to said reservoir, and a pressure controlled trip mechanism for operating said double valve means responsive to predetermined low and high pressures of the generated gas in said system, a housing for said double valve means shaped to integrally include said water reservoir, said points of admission and discharge of water being oppositely and co-axially disposed and each defining a valve seat, said double valve means comprising a valve at each end of a shank portion adapted to seat on an adjacent valve seat, a bore at each end of said housing co-axial with said valve seats, a guide stem provided with a plurality of longitudinal grooves extending axially from each valve slidably extending into an adjacent bore, and a guide rod fixed to one guide stem operatively connecting said double valve means to said trip mechanism.

10. A chemical heating device for use in a system for generating gas from liquefied gas including a tank containing said liquefied gas comprising a heating well traversing said tank, a chemical container positioned at the bottom of said heating well and adjacent the bottom of said tank, a water reservoir mounted exteriorly of said tank, a double valve means controlling the admission of water into and the discharge of water from said reservoir, conduit means communicating said reservoir to said chemical container, conduit means supplying water to said reservoir, and a pressure controlled trip mechanism for operating said double valve means responsive to predetermined low and high pressures of the generated gas in said system, a perforated trap positioned at the bottom of said tank into which the lower end portion of said heating well projects, said chemical container being disposed wholly within said trap and insulating means at the top of said chemical container whereby substantially all of the heat generated by said chemical container is directed into said trap.

WILLIAM H. GRINDLE.